United States Patent [19]

Alexander

US 6,594,842 B2
Jul. 22, 2003

(54) LOADING DOCK WITH SEGMENTED WIDE LIP

(75) Inventor: James C. Alexander, London (CA)

(73) Assignee: United Dominion Industries, Inc., Charlotte, NC (US)

(*) Notice: Subject to any disclaimer, the term of this patent is extended or adjusted under 35 U.S.C. 154(b) by 0 days.

(21) Appl. No.: 10/058,297

(22) Filed: Jan. 30, 2002

(65) Prior Publication Data

US 2002/0170127 A1 Nov. 21, 2002

Related U.S. Application Data

(62) Division of application No. 09/860,603, filed on May 21, 2001, now Pat. No. 6,405,397.

(51) Int. Cl.[7] .................................................. E01D 1/00
(52) U.S. Cl. ........................ 14/71.3; 14/69.5; 14/71.1
(58) Field of Search ................................ 14/69.5, 71.1, 14/71.3, 71.7

(56) References Cited

U.S. PATENT DOCUMENTS

| 2,798,620 | A | * | 7/1957 | Allan | 14/69.5 |
|---|---|---|---|---|---|
| 4,020,517 | A | * | 5/1977 | Waddell | 14/71.5 |
| 5,311,628 | A | * | 5/1994 | Springer et al. | 14/71.1 |
| 5,457,838 | A | * | 10/1995 | Gelder et al. | 14/69.5 |
| 5,784,740 | A | * | 7/1998 | DiSieno et al. | 14/71.3 |
| 5,881,414 | A | * | 3/1999 | Alexander | 14/71.1 |
| 6,006,389 | A | * | 12/1999 | Alexander | 14/71.1 |
| 6,070,283 | A | * | 6/2000 | Hahn | 14/69.5 |
| 6,276,016 | B1 | * | 8/2001 | Springer | 14/69.5 |

FOREIGN PATENT DOCUMENTS

EP   1 099 653   * 5/2001

* cited by examiner

*Primary Examiner*—Gary S. Hartmann
(74) *Attorney, Agent, or Firm*—Baker & Hostetler, L.L.P.

(57) ABSTRACT

A dock leveler that is mounted in a recessed pit and having a deck as wide as necessary to provide access to the transport vehicle. A lip is mounted to the front of the deck of the leveler and pivoted in a conventional manner. At each side of the lip are narrower lip segments. The bumpers are supported with vertical plates so that the plates may fit in the gap between the lip and the lip segments. Thus the lip segments may be stored behind the bumpers and the effective width of the lip may be greater than the space between the bumpers. The lip segment has a back edge that abuts the front of the deck when extended, or may be of the "barrier lip" configuration where the rear of the lip is extended above the top of the deck to provide a run-off guard when the lip is pendent. The lip may also extend linearly. Each lip segment has a hydraulic cylinder and a control valve or may be manually selected. There is a control circuit which can selectively activate any of the lips.

17 Claims, 9 Drawing Sheets

LOADING DOCK WITH SEGMENTED WIDE LIP

This application is a divisional of Ser. No. 09/860,603, filed on May 21, 2001 now U.S. Pat. No. 6,405,397.

BACKGROUND OF THE INVENTION

1. Field of the Invention

This invention relates to loading dock equipment and in particular to dock levelers that are used to span the distance between a loading dock and the bed of a vehicle. Specifically, it deals with a specific type of lip for a dock leveler.

2. Prior Art

A conventional loading dock for transport vehicles typically has a dock leveler with a dock bumper placed on each side of the dock opening mounted on the dock face in a fixed position. The width of the dock leveler is usually limited to a maximum width of seven feet because if the bumpers are placed wider apart there is a risk that the vehicle, which is limited in width, may miss the bumper and strike the dock leveler. Consequently, the probability of damage is relatively high if the vehicle strikes the end of the leveler. Some specialty dock levelers are wider than seven feet to provide space for wider than normal cargo. Examples of these devices are shown in U.S. Pat. Nos. 5,881,414 and 6,070,203. U.S. Pat. No. 4,420,849 illustrates a dock leveler with bumpers that fold away to accommodate wide loads, but with all of these devices the width of lip is still limited by the space between the dock bumpers. U.S. Pat. No. 6,081,954 describes a dock leveler with a lip that extends linearly rather than rotating in the conventional manner. However the distance between the bumpers would still limit the width of the leveler.

Segmented lips are generally known. These are manually operated by the dock worker.

There is a need for a dock leveler which has a lip that is wider than the distance between the dock bumpers. One method of shipping cargo employs two rows of wheeled carts on a transport vehicle. When a row of carts is pulled from the transport vehicle onto the loading dock, the outer wheels of the carts will extend beyond the seven foot width of a conventional dock leveler lip. Thus the wheels of the cart may fall into the gap between the back of the transport vehicle and the front of the dock bumper, and the movement of the carts may be impeded.

A potential problem with increasing the width of the lip is interference with the side of the transport vehicle if the vehicle is not properly centered on the loading dock. This problem is not unique to wide lips. Such interference is possible even on standard width lips if the door opening of the vehicle is not much greater than the width of the lip. Dock levelers having a lip with a selectable segment at one or both sides have been constructed but with manual activation requiring the operator to reach behind the lip to engage a latch. Such lips did not allow the width of the lip to exceed the distance between the bumpers.

SUMMARY OF THE INVENTION

Given the problems in the prior art, it is an object of this invention to define a dock leveler that has the versatility to employ a lip of different widths.

It is another object of this invention to provide for a dock leveler that allows a wide lip to be safely used.

It is yet another object of this invention to provide a dock system employing a segmented lip that allows the operator to select and operate the lip segments automatically from the dock floor.

This invention is a dock leveler having a lip with selectable segments at either side. The segments may remain pendent or be selected to be extended with the lip. The lip may be of conventional configuration placed between the dock bumpers or may be wider than the space between the bumpers. Thus the lip may be almost as wide as the opening in the back of the transport vehicle and all the wheels of the cart may roll easily from the bed of the transport vehicle over the lip and onto the dock leveler. If the transport vehicle is not properly centered on the loading dock then the operator may select more lip segments on one side than the other.

The first preferred embodiment of this invention employs a dock leveler that is mounted in a recessed pit of conventional construction. The dock leveler may be as wide as necessary to provide access to the transport vehicle. A lip is mounted to the front of the deck of the leveler and pivoted in a conventional manner. At each side of the lip are narrower lip segments. The bumpers are supported with vertical plates so that the plates may fit in the gap between the lip and the lip segments. Thus the lip segments may be stored behind the bumpers and the effective width of the lip may be greater than the space between the bumpers. The lip segment itself may be of conventional configuration where the back edge of the lip abuts the front of the deck when extended, or it may be of the "barrier lip" configuration where the rear of the lip is extended above the top of the deck to provide a run-off guard when the lip is pendent. While either lip configuration may be used with this invention, the lip segments are preferably of conventional configuration so that the segments that are left pendent do not obstruct movement of wide cargo over the dock leveler. Each lip segment has a hydraulic cylinder and a control valve. The operator may observe the relationship of the transport vehicle and the dock leveler and then move switches on the control panel to select the segments that are to be extended with the lip.

The second preferred embodiment is similar to the first except that the lip segments are selected manually and extended mechanically as the lip extends. They are retracted mechanically as the lip retracts.

The third preferred embodiment is similar to the second except that the lip segments are selected manually and extended by springs that urge them to the extended position. They are retracted as the lip retracts.

The fourth preferred embodiment is similar to the first except that the dock leveler has a lip that retracts linearly rather than by rotation. The segments may be extended and retracted hydraulically or mechanically as in the previous embodiments.

DESCRIPTION OF THE PREFERRED EMBODIMENTS

Figure 1:
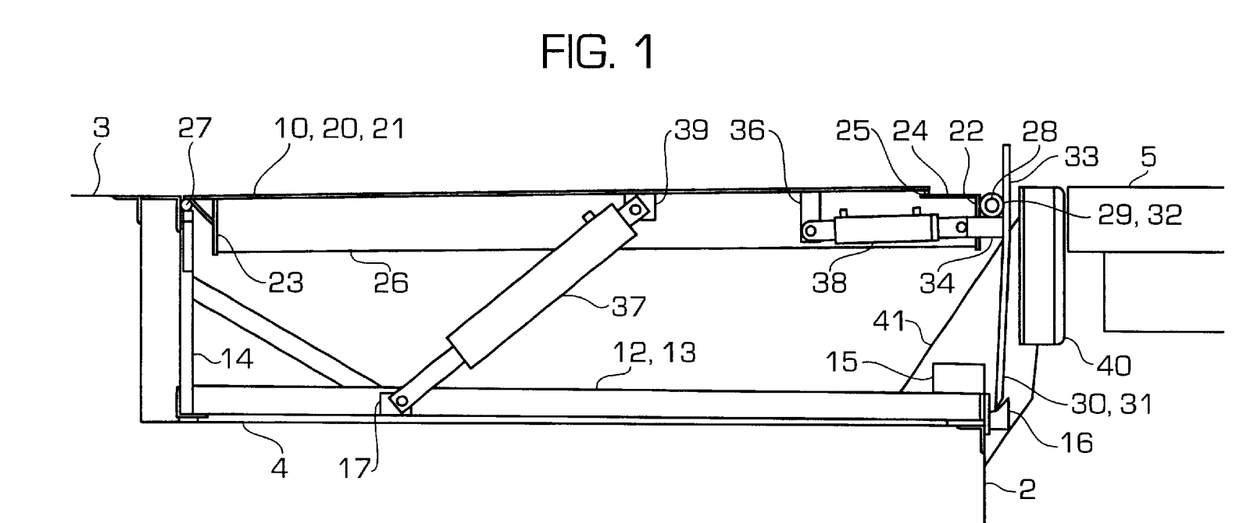
FIG. 1 is a sectional side view of the first preferred embodiment of this invention illustrating the dock configuration and the hydraulic cylinders that operate the leveler and the lip.
Figure 2:
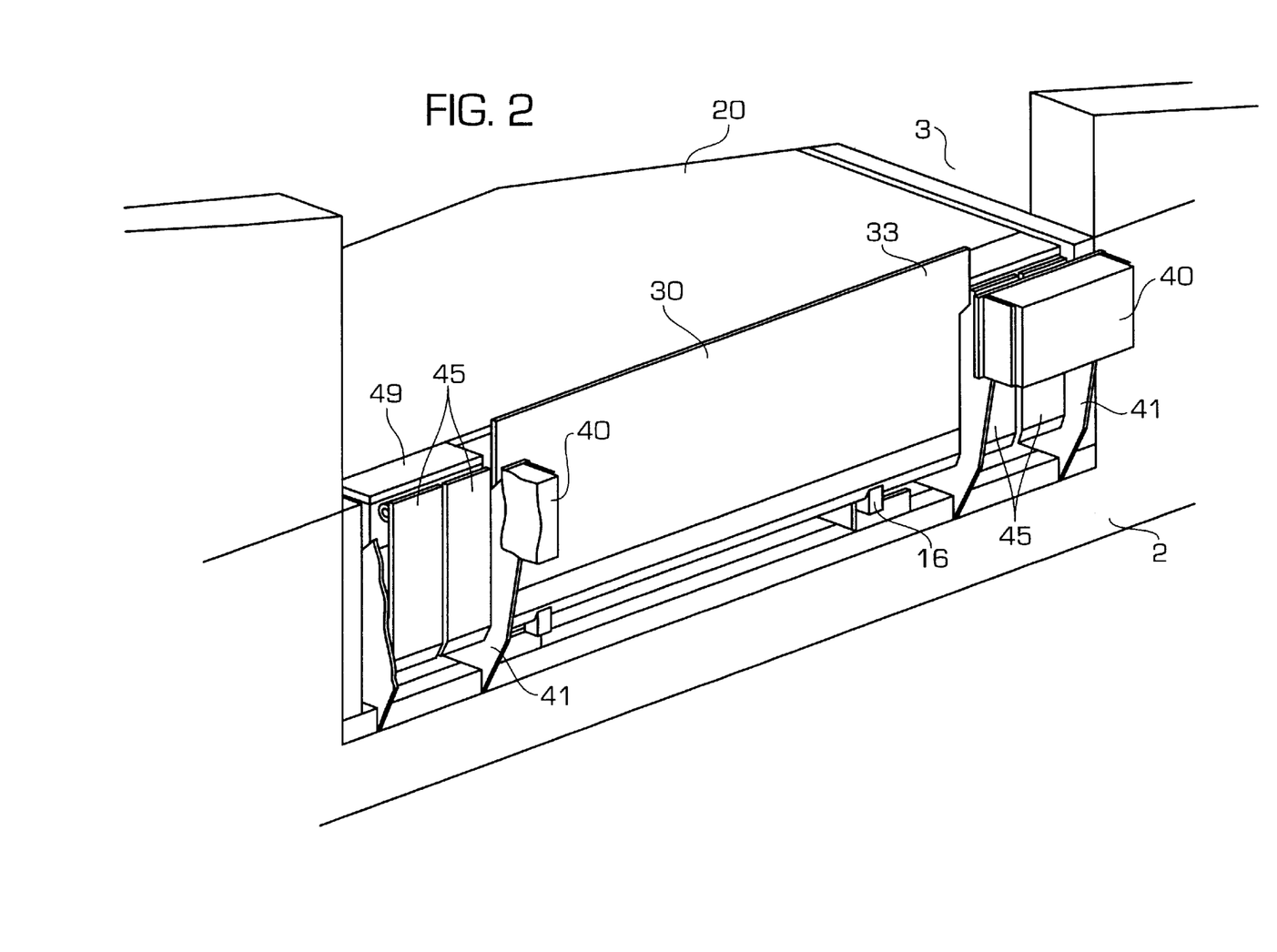
FIG. 2 is a perspective view of the first preferred embodiment of this invention with the leveler stored and one of the bumpers partially cut away to illustrate the lip segments stored behind the bumper.
Figure 3:
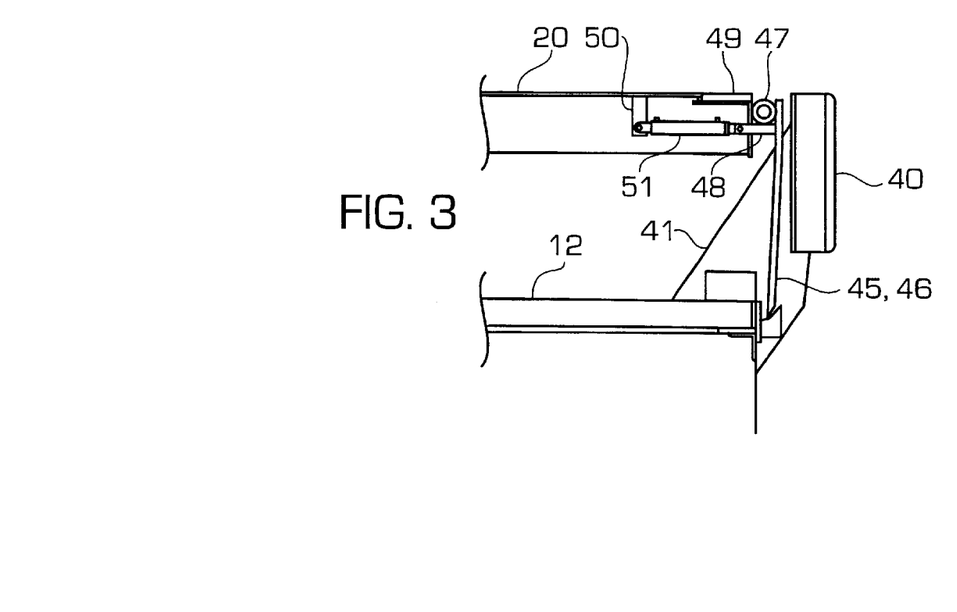
FIG. 3 is a partial sectional side view of the first preferred embodiment of this invention illustrating a lip segment with hydraulic cylinder for activation.

Referring now to FIGS. 1 through 3 the essential components of the first preferred embodiment of this invention will be described, it being understood that a typical dock leveler has other constructional features, not illustrated. A loading dock is shown with a dock face 2 and a dock floor 3 with a recessed pit 4. A transport vehicle 5 is shown in front of the dock. The dock leveler 10 is typically mounted in the pit 4. A frame 12 has horizontal members 13 and a vertical brace 14 both of which rest in the pit. The leveler frame also has stop blocks 15 and lip keepers 16 at the forward end of the horizontal members 13. The leveler 10 has a deck 20 which has a top plate 21, a bar 22 that forms a front header and a bar 23 that forms a rear header. A recessed ledge is formed at the front of the deck by a plate 24 and a spacer bar 25 to accommodate a lip of the "Run-Off Guard" configuration which is described later. Beams 26 attached to the top plate and header bars provide structural strength to the assembly. The deck 20 is pivoted to the frame by hinge pins 27.

Figure 4:
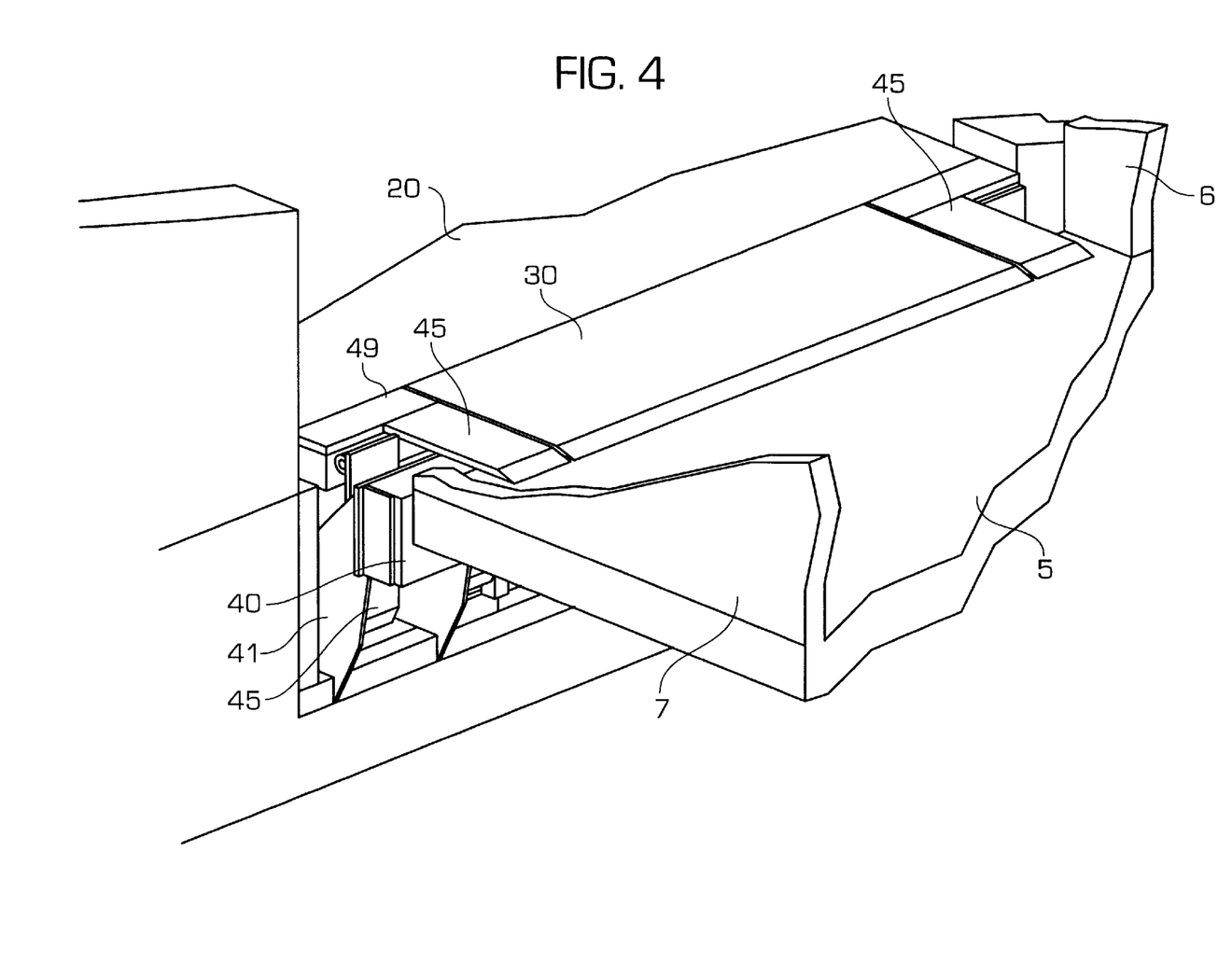
FIG. 4 is a perspective view of the lip and two segments in the operative position resting on a transport vehicle centered on the loading dock.
Figure 5:
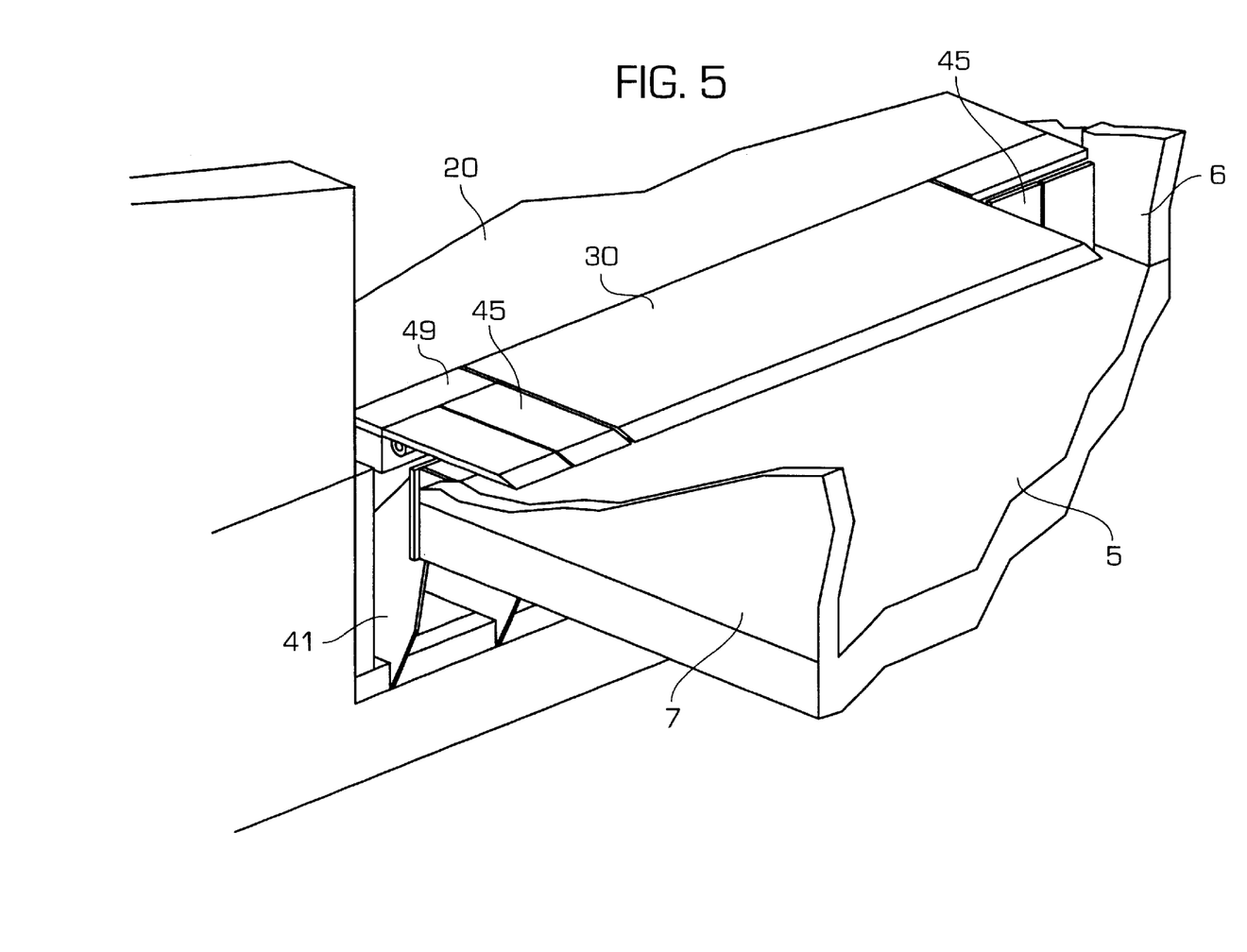
FIG. 5 is a perspective view of the lip and two segments in the operative position resting on a transport vehicle not centered on the loading dock.

A lip assembly 30 having a lip plate 31 and hinge tubes 32 is pivoted to the deck on a pin 28 inserted in hinge tubes 29 attached to the front header bar 21 and hinge tubes 32 attached to the lip plate 31. The leveler is held horizontal in the stored position with the lip 30 in the pendent position and retained in the lip keepers 16. The lip illustrated is of a configuration known in the industry by various names such as "Barrier Lip", "Safety Lip", "Run-Off Guard" Or "Post Office Lip". The lip 31 has an upper portion 33 which extends above the deck 20 when the lip is pendent. The purpose is to prevent wheeled vehicles from inadvertently running off the edge of an open dock. When the lip 30 is extended, the "Run-Off Guard" portion 33 of the lip rests in the recess of the deck 20 formed by the plate 24 as shown on FIGS. 4 and 5. A bumper 40 is mounted to each side of the dock by vertical support plates 41. This construction allows a narrow space between the lip 30 and the lip segments 45 so that wheels passing over the dock leveler have adequate support. The bumpers illustrated are fixed to the dock and are suitable for loading vehicles that are at dock height or higher. Other mounting means may allow the bumpers to move downward to allow loading of vehicles that are lower than the dock but such mounting is not part of this invention. FIGS. 4 and 5 illustrate a perspective view of the bumper 40.

FIG. 1 illustrates the configuration of a typical hydraulic system used to operate the dock leveler. An arm 34 is attached to the lip 30. Mounting brackets 36 and 39 are attached to the deck 20, and mounting brackets 17 are attached to the frame 12. A main cylinder 37 is pinned at one end to the brackets 36 and at the other end to the brackets 17. When hydraulic fluid is supplied to the cylinder the deck 20 will be lifted. Similarly the lip cylinder 38 is pinned at one end to the lip arm 33 and at the other end to the deck bracket 35. When hydraulic fluid supplied to either port of the cylinder 37 the lip 30 will be extended or retracted. A hydraulic system suitable for controlling the dock leveler is shown on FIG. 12 and is also described in U.S. Pat. No. 4,641,388.

Referring now to FIGS. 2 and 3, a lip segment 45 has a lip plate 46, a hinge tube 47 and an arm 48. The lip segment is carried on the deck 20 by the lip hinge pin 28. The lip segment is of the conventional configuration rather "Run-Off Guard" configuration so that it does not interfere with the movement of wide cargo when left in the pendent position. That is, the segments do not have a portion extending above the deck 20. A plate 49 is attached to the deck 20 to fill a portion of the recessed ledge for the "Run-Off Guard" portion of the lip 30. As illustrated in FIG. 3 a bracket 50 is attached to the underside of deck 20 and a hydraulic cylinder 51 is pinned at one end to the arm 48 and at the other end to the deck bracket 50.

FIGS. 4 and 5 illustrate perspective views of the dock leveler in the operative position with the lip 30 extended and supported by the bed of the transport vehicle 5. The transport vehicle 5 has side walls 6 and 7 that limit the width of the lip. FIG. 4 illustrates a transport vehicle that is centered on the loading dock. One lip segment 45 is selected at each side of the lip to provide a wide lip surface. FIG. 5 illustrates a transport vehicle that is not centered on the loading dock. There is no room to extend a lip segment 45 between the lip 30 and the side wall 6 of the transport vehicle 5. Two lip segments 45 are selected between the lip 30 and the side wall 7 to provide a wide lip surface.

It will be appreciated that the lip segments 45 are stored as illustrated in FIG. 2 behind the bumper 40 which is fixed to the frame via the support 41. The dock operator inspects the relationship of the transport vehicle to the dock to determine which lip segments 45 are required to provide a suitable surface to support the wheels of the carts. The operator then uses the control circuit, to be discussed herein, to select segments of the lip to be activated. The deck is then raised in a conventional manner until the lip segments are clear of the bumpers. With the deck thus elevated the lip 30 and the segments 45 previously selected are then extended as illustrated in FIGS. 4 and 5. When the loading of the transport vehicle is completed the converse operation takes place, with the lip 30 and segments 45 retracted to the pendent position as the deck is elevated.

Figure 12:
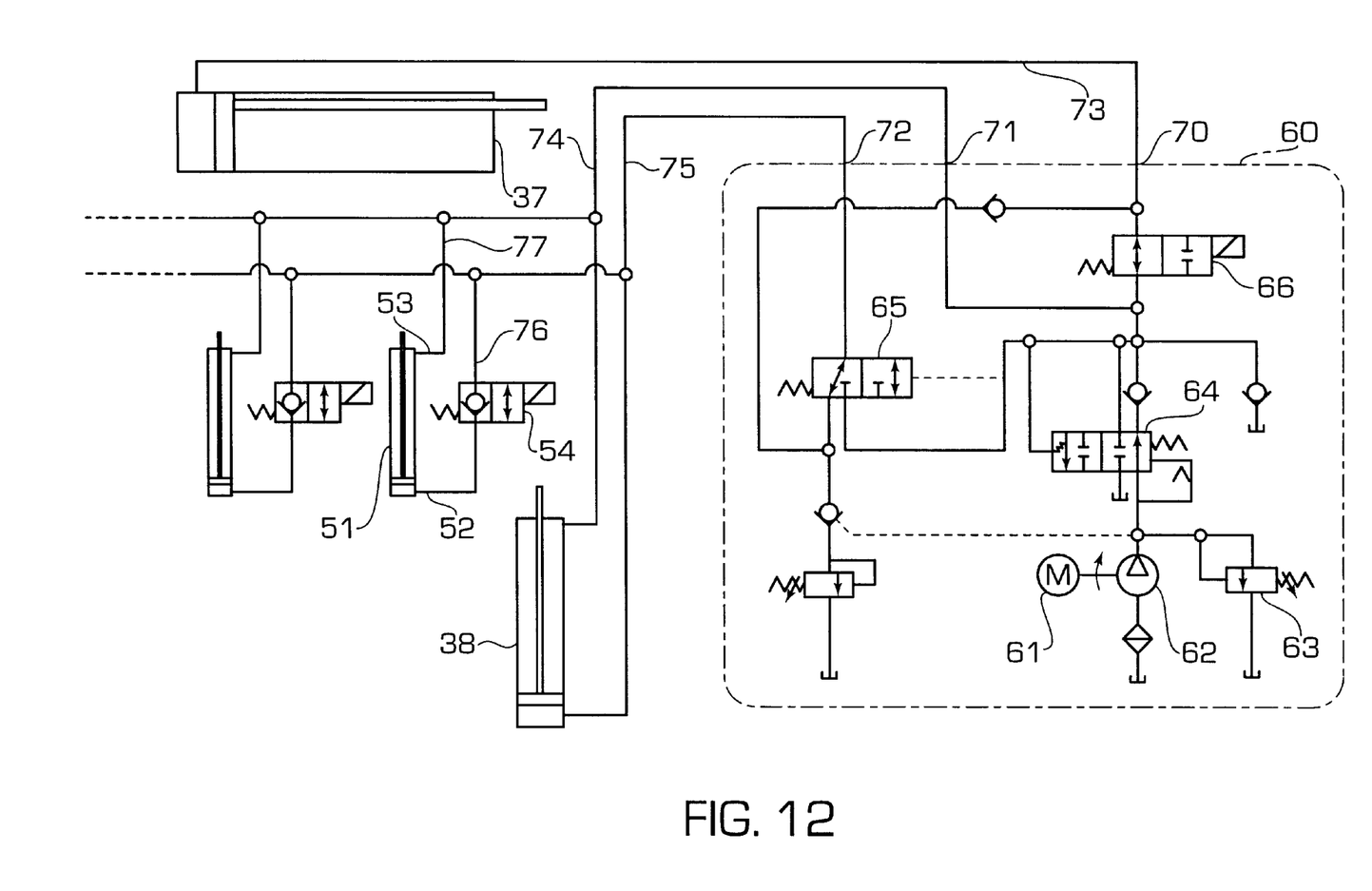
FIG. 12 is a schematic of a hydraulic circuit illustrating a method of selectively activating lip segments.

A hydraulic circuit suitable for controlling the dock leveler 10 and the selective extension and retraction of the lip segments 45 is illustrated in FIG. 12. The portion enclosed by the rectangular dashed line represents a typical hydraulic power unit 60 having a motor 61, pump 62 and pressure relief valve 63. A shuttle valve 64 allows fluid to be directed to and from the main cylinder 37. A sequence valve 65 controls the extension of the lip cylinder 38. Hydraulic fluid is directed to the main cylinder 37 through a port 70 on the hydraulic power unit 60 and the hose 73. A solenoid valve 66 is optional and allows flow to the main cylinder 37 to be blocked to initiate lip extension before the main cylinder 37 reaches full extension. Hydraulic fluid is directed to the extend port of the lip cylinder 38 through the port 72 on the hydraulic power unit 70 and the hose 75. Similarly, hydraulic fluid is directed to the retract port of the lip cylinder 38 through the port 71 on the hydraulic power unit 60 and the hose 74.

The portion of the hydraulic circuit providing selective control of each lip segment 45 comprises a lip segment cylinder 51, a solenoid valve 54 and hoses 76 and 77. The lip segment cylinder 51 has an "extend" port 52 and a "retract" port 53. The solenoid valve 54 is preferably a "poppet" configuration which allows fluid to flow in one direction when the coil of the valve is not energized. Thus fluid in the cylinder may flow from the retract port 53 through the hoses 76 and the lip segment 45 will fall to the pendent position. When the coil of the valve 54 is energized, fluid directed through the hose 75 to extend the lip cylinder 38 will also flow through the hose 76 and the valve 54 to extend the lip segment cylinder 51. A similar cylinder and valve is required for each lip segment 45.

Figure 13:
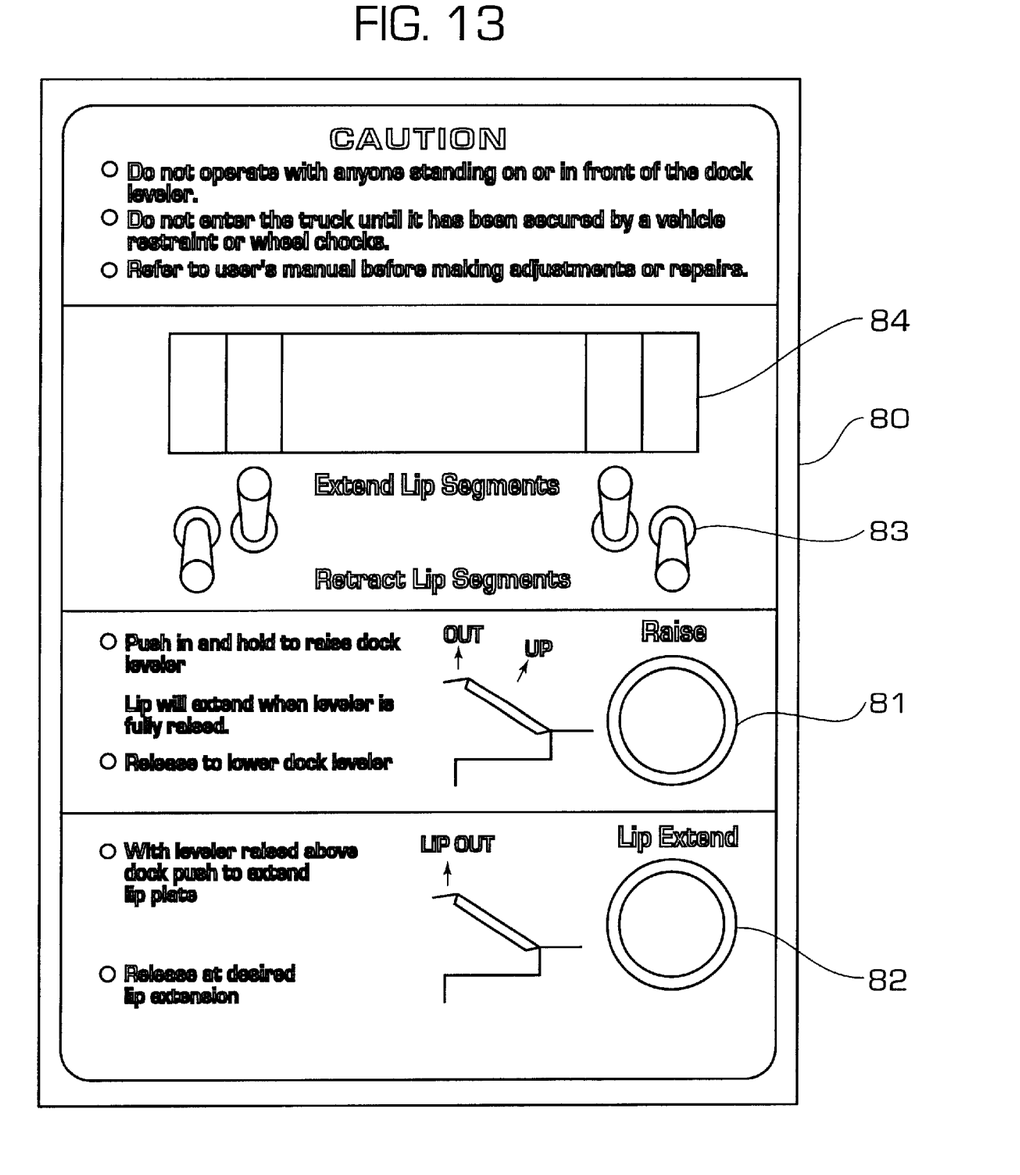
FIG. 13 is a front view of a control panel illustrating a method of selectively activating lip segments using toggle switches.

FIG. 13 illustrates the face of a control panel 80 suitable for controlling the hydraulic circuit shown in FIG. 12. The control panel has a "Raise" button 81 that causes the hydraulic power unit to operate and direct fluid to the main cylinder 37. The "Lip Extend" button 82 is optional and allows the lip to be extended before the deck 20 reaches the fully raised position. The control panel has a number of toggle switches 83, one for each lip segment 45 that energize each solenoid valve 54 to select a particular lip segment 45. When a toggle switch 83 is moved to the upper position a lip segment 45 is selected for extension with the lip 30. When a toggle switch 83 is moved to the lower position a lip segment 45 remains pendent. The graphic representation 84 indicates which lip segment is selected by each switch.

Figure 14:
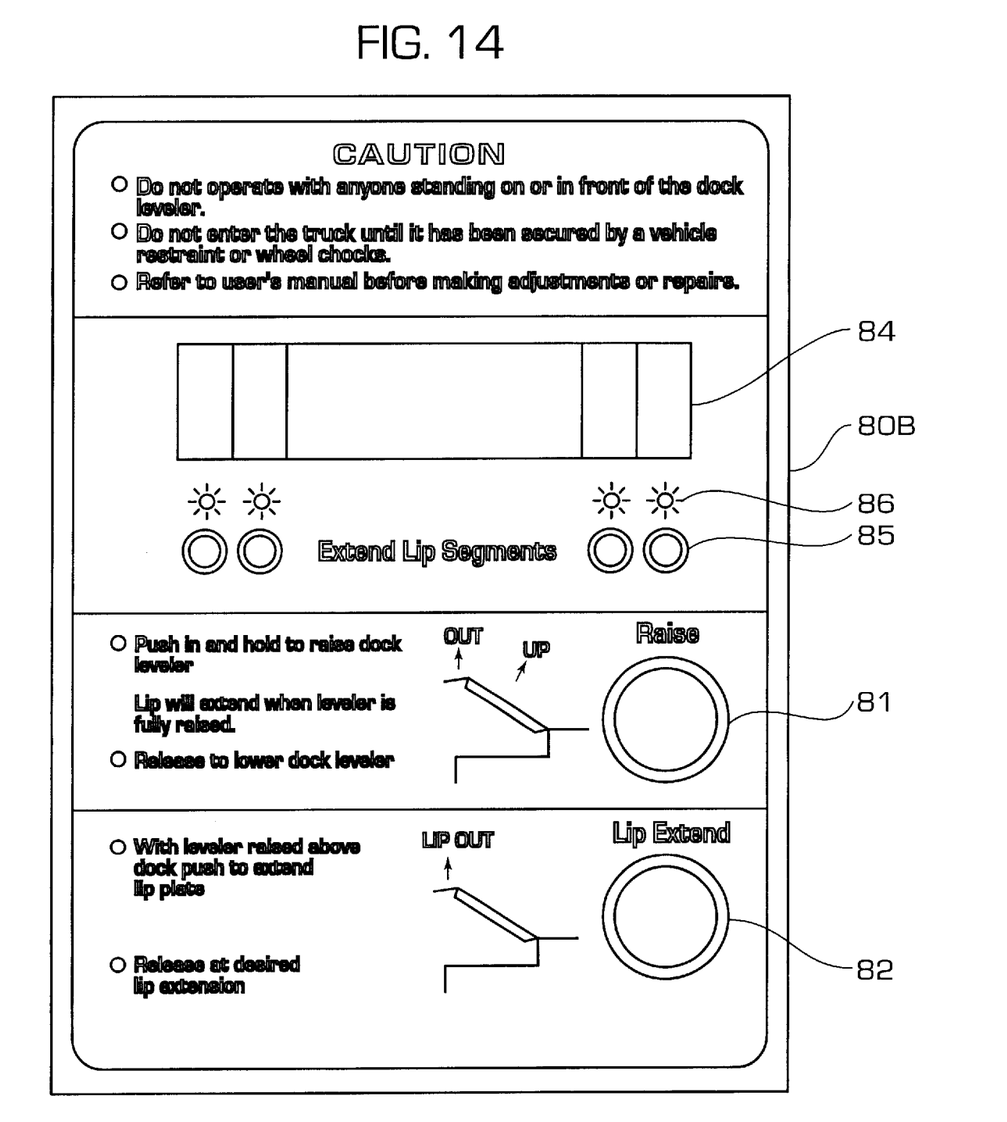
FIG. 14 is a front view of a control panel illustrating a method of selectively activating lip segments using push buttons and indicator lights.

FIG. 14 illustrates the face of a control panel 80B with an alternate configuration for controlling the hydraulic circuit shown in FIG. 12. The control panel has a "Raise" button 81 and a "Lip Extend" button 82. A number of push button switches 85 energize the solenoid valves 54 to select a particular lip segment 45. Each push button switch 85 has a corresponding indicator light 86 to indicate whether the corresponding solenoid valve 54 is energized. The push button switches may be replaced by momentary toggle switches or momentary switches of other configurations. The use of momentary switches rather than two-position switches 83 as illustrated in FIG. 13 allows greater control flexibility. For example the control panel in FIG. 13 will leave each lip segment 45 selected or not selected as determined by the position of the toggle switch 83.

If a subsequent transport vehicle is not at the same position relative to the dock then a selected lip segment may interfere with a side wall of the vehicle when the lip 30 is extended. The control panel with momentary switches 85 and indicator lights 86 illustrated by FIG. 14 allows greater flexibility in the control functions. For example, the lip segments selected for use with a transport vehicle may be automatically not selected after the leveler is restored to eliminate the possibility of interference of the next vehicle which may be parked in a different position or have a narrower door opening. Also the selection of the outermost lip segment may automatically energize the valve for the inner lip segment to ensure both lip segments are extended to prevent a gap between the lip and the outer segment. These alternative control panel configurations are described only to illustrate the flexibility of the use of this invention. A specific control circuit is not part of this invention and specific electrical circuits are not shown. The circuits required to perform such functions will be readily understood by those skilled in this art.

Figure 6:
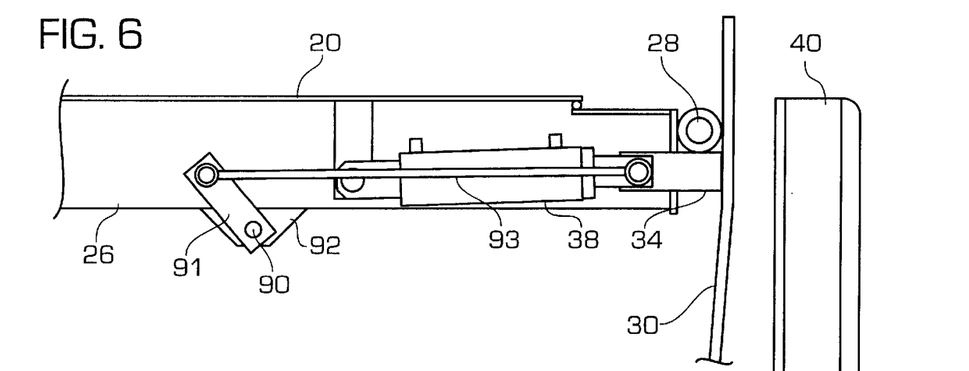
FIG. 6 is a partial sectional side view of the second preferred embodiment of this invention illustrating the lip connected to the activating mechanism for the lip segments.
Figure 7:
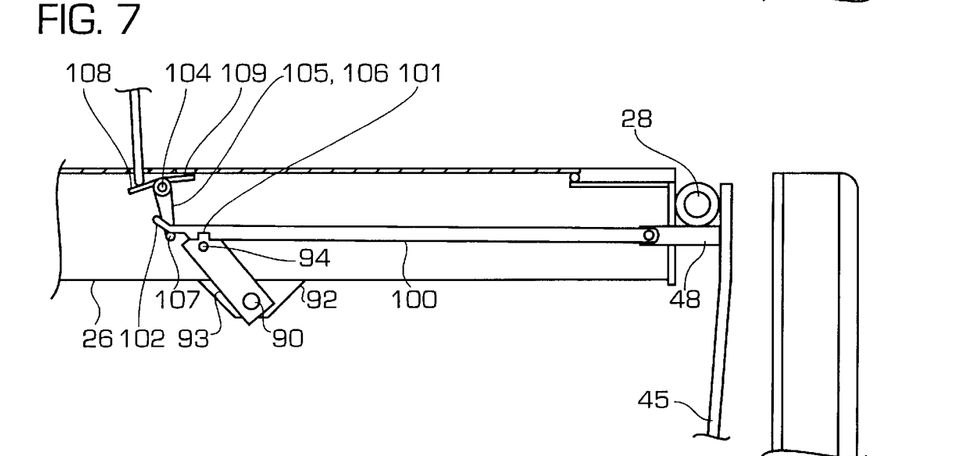
FIG. 7 is a partial sectional side view of the second preferred embodiment of this invention illustrating a lip segment not selected for activation.
Figure 8:
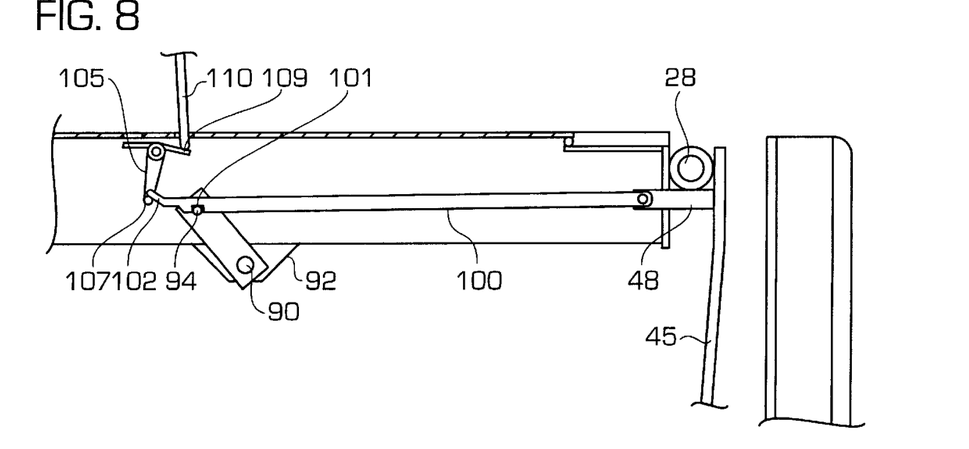
FIG. 8 is a partial sectional side view of the second preferred embodiment of this invention illustrating a lip segment selected for activation.

FIGS. 6, 7 and 8 illustrate a second preferred embodiment of this invention. As illustrated in FIG. 6 a shaft 90 with a crank arm 91 is supported by brackets 92 attached to the beams 26 of the deck 20. A connecting rod 93 has one end attached to the lip arm 34 and the other end to the crank arm 91. Thus as the lip is extended by the hydraulic cylinder 38 then the shaft 90 is rotated clockwise. FIG. 7 is a sectional view of the dock leveler at the location of a lip segment 45. The shaft 90 has a crank arm 93 with a pin 94. A bar 100 is attached at one end to the arm 48 on a lip segment 45. The other end of the bar 100 has a notch 101 and a cam surface 102. A shaft 104 is attached to a beam 26 and carries a selector lever 105. The selector lever 105 has an arm 106 with a bar 107, a disengagement lever 108 and an engagement lever 109. As shown in FIG. 7 a control bar 110 may be inserted through an access hole in the top plate 21 of the deck 20 to depress the disengagement lever 108 and rotate the lever 105 counterclockwise. In this position the bar 107 engages the cam surface 102 of the bar 100 and lifts the notch 101 out of engagement with the pin 94.

Thus when the lip 30 is extended and the shaft 90 rotates clockwise then the lip segment remains pendent. FIG. 8 shows the control bar 110 depressing the engagement lever 109 to rotate the lever 105 clockwise and disengage the cam surface 102. The bar 100 is lowered to allow the notch 101 to engage the pin 94 on the crank arm 93. Thus the lip segment 45 is extended when the lip 30 is extended and causes the shaft 90 to rotate clockwise.

Figure 9:
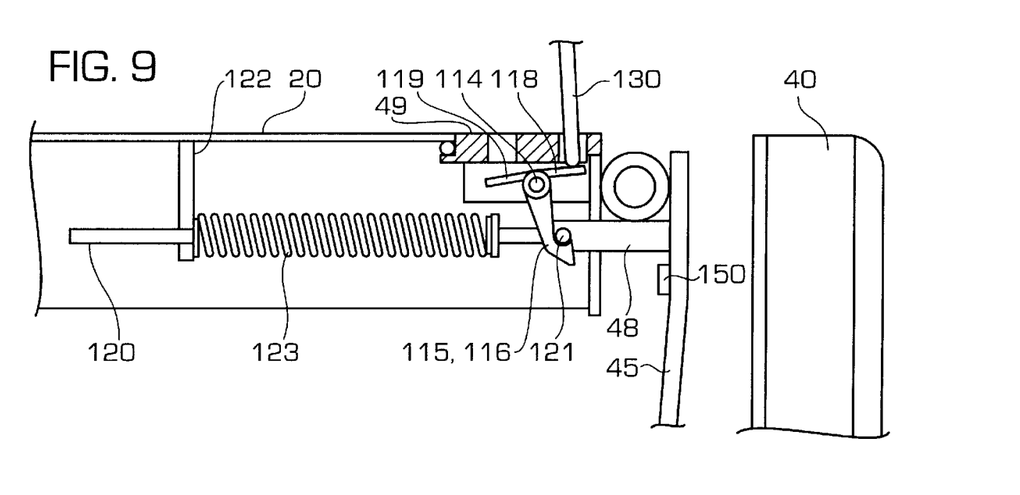
FIG. 9 is a partial sectional side view of the third preferred embodiment of this invention illustrating a lip segment not selected for activation.
Figure 10:
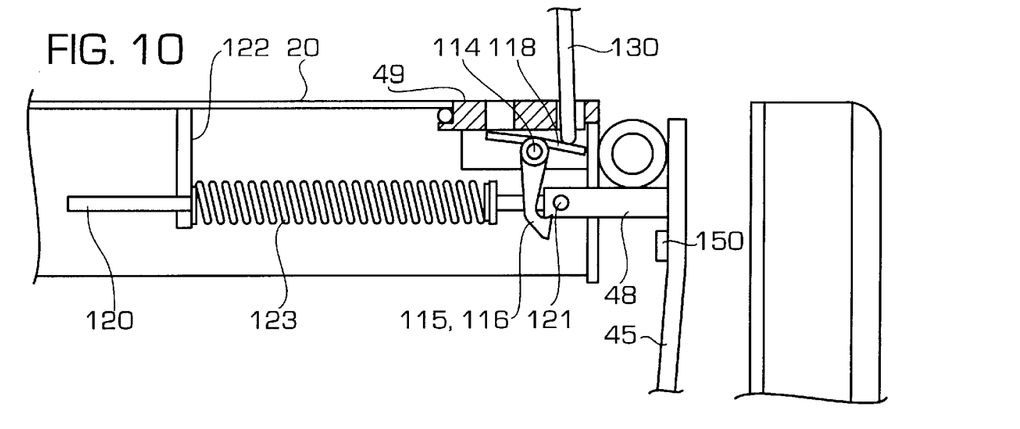
FIG. 10 is a partial sectional side view of the third preferred embodiment of this invention illustrating a lip segment selected for activation.

A third preferred embodiment of this invention is illustrated in FIGS. 9 and 10 with respect to the activation of the lip segment 45. A pin 114 is attached to a beam 26 and carries a selector lever 115. The selector lever 115 has a hook 116, a disengagement lever 118 and an engagement lever 119. A push rod 120 has one end attached to the arm 48 on the lip segment 45 by the pin 121. The other end of the push rod 120 is guided by a hole in an anchor bracket 122 attached to the deck 20. A spring 123 is carried on the rod and urges the lip segment 45 to rotate counterclockwise. A control tab 150, as illustrated in FIG. 9, is mounted on the lip segment 45 and extends laterally behind the lip 30. Thus, when the lip 30 is retracted, it engages the control tab 150 and forces the lip segment 45 to the retracted position. As shown in FIG. 9 the hook 116 of the selector lever 115 engages the pin 121 and prevents the lip segment 45 from extending when the lip 30 extends.

As shown in FIG. 10, the control bar 130 may be inserted through an access hole in the plate 49 to depress the disengagement lever 118. The lever 115 rotated counterclockwise and the hook 116 is moved clear of the pin 121. Thus when the lip 30 is extended, the spring 123 causes the lip segment 45 to also extend. When the lip 30 is pendant and the control bar 130 is used to depress the engagement lever 119, via the other hole in plate 49. Thus the lever 115 is rotated counterclockwise and the hook 116 engages the pin 121 as shown in FIG. 9 and the lip segment 45 is locked and cannot extend.

Figure 11:
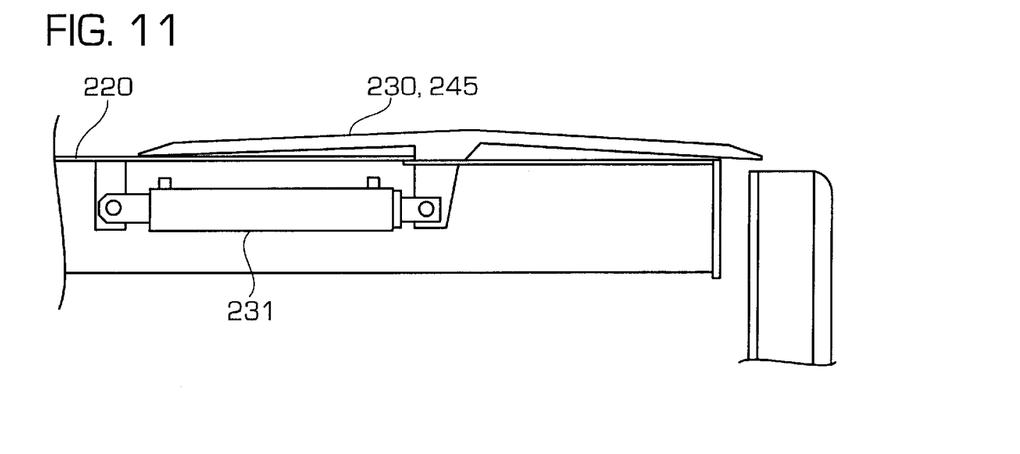
FIG. 11 is a partial sectional side view of the fourth preferred embodiment of this invention illustrating a lip segment extended linearly by a hydraulic cylinder.

FIG. 11 shows a fourth preferred embodiment of this invention. A dock leveler deck 220 has a lip 230 which is retracted and extended linearly rather than by pivoting. FIG. 11 shows a lip segment 245 which can be extended or retracted by a hydraulic cylinder 231. Thus the operative width of the lip may be increased by selectively extending lip segments as in the previous embodiments.

While this invention has been described with respect to the preferred embodiments, it will be apparent to those skilled in this art that modifications of this invention may be practiced without departing from the scope of the invention. For example the operation of the dock leveler may be achieved by mechanical linkages or electric or pneumatic actuators rather than hydraulic cylinders.

Another modification deals with the configuration of the bumper. It may be constructed as a series of vertically extending projections positioned in the gaps between the lip segments. A resilient member may be placed as needed. If the contact surface is a plate, then the resilient member can be mounted behind the lip. In the case of the embodiment of FIG. 3 the resilient member can be mounted on the support 41 and positioned behind the lip and the bumper pad 40 then eliminated. By this technique the bumpers can be located at the same relative distance from the dock face as is conventional so that the length of the lip can be maintained within customary dimensions.

I claim:

1. A dock leveler system comprising: a dock surface deck mounted for pivotal movement relative to said dock surface, a first lip mounted to one end of the deck of the leveler for pivotal movement and a second lip mounted to said one end of the deck for movement between a stored position and an extended position, and a control circuit for selectively activating any of said first and second lips.

2. A dock leveler system of claim 1, wherein said control system comprises a source of hydraulic fluid, a series of lip cylinders connected to respective lips, valves interposed between said source of hydraulic fluid and said lip cylinders and control switches to selectively activate said valves and thereby actuate respective lips for extension.

3. A dock leveler system of claim 1 further comprising, a first fixed bumper projecting outward from said dock and positioned between said first lip and said second lip.

4. A dock leveler system according to claim 1 further comprising a third lip mounted to said one end of the deck for movement between a stored position and an extended position, said third lip positioned on a side of said first lip opposite to said second lip.

5. A dock leveler according to claim 4 wherein said third lip comprises two lip segments, each of said lip segments mounted for independent pivotal movement on said deck, and said control circuit includes switches for independently actuating each of said lip segments.

6. A dock leveler according to claim 4 further comprising a bumper fixedly mounted to said end of the deck and projecting outward between said first lip and said third lip.

7. A dock leveler according to claim 6 further comprising a support plate positioned in a space between the first lip and the second lip to support said bumper.

8. A dock leveler of claim 4 wherein said control circuit for selectively activating any of said first, second or third lips is positioned on said dock surface.

9. A dock leveler of claim 8 further comprising a hydraulic cylinder mounted to said deck and operatively coupled to said second lip to extend and retract said second lip said control circuit controls operation of said hydraulic cylinder.

10. A dock leveler of claim 8 further comprising a hydraulic cylinder mounted to said deck and operatively coupled to said third lip to extend and retract said third lip and said control circuit controls operation of said third lip.

11. A dock leveler according to claim 1 wherein said second lip comprises two lip segments, each of said lip segments mounted for independent pivotal movement on said deck, and said control circuit includes switches for independently actuating each of said lip segments.

12. A dock leveler according to claim 1 wherein a bumper is mounted to project outward in front of said first lip when said first lip is in the stored pendant position.

13. A dock leveler according to claim 12, further comprising a third lip mounted to said one end of deck for movement between a stored position and an extended position and a support plate positioned in a space between the first lip and a third lip to support second bumper.

14. A dock leveler of claim 1 wherein said control circuit for selectively activating any of said first or second lips is positioned on said dock surface.

15. The dock leveler system of claim 1, wherein all of the lips are substantially of equal length.

16. The dock leveler system of claim 15, wherein the control circuit further comprises a first and second switch for selectively raising and lowering the first and second lips.

17. The dock leveler system of claim 15, further comprising a third lip mounted next to the second lip on the opposite side of the second lip from the first lip and the control circuit is configured such that raising the third lip automatically raises the second lip.

* * * * *